June 29, 1954 — R. G. BIRR — 2,682,328
DISPENSING MACHINE
Filed Nov. 12, 1949 — 5 Sheets-Sheet 5
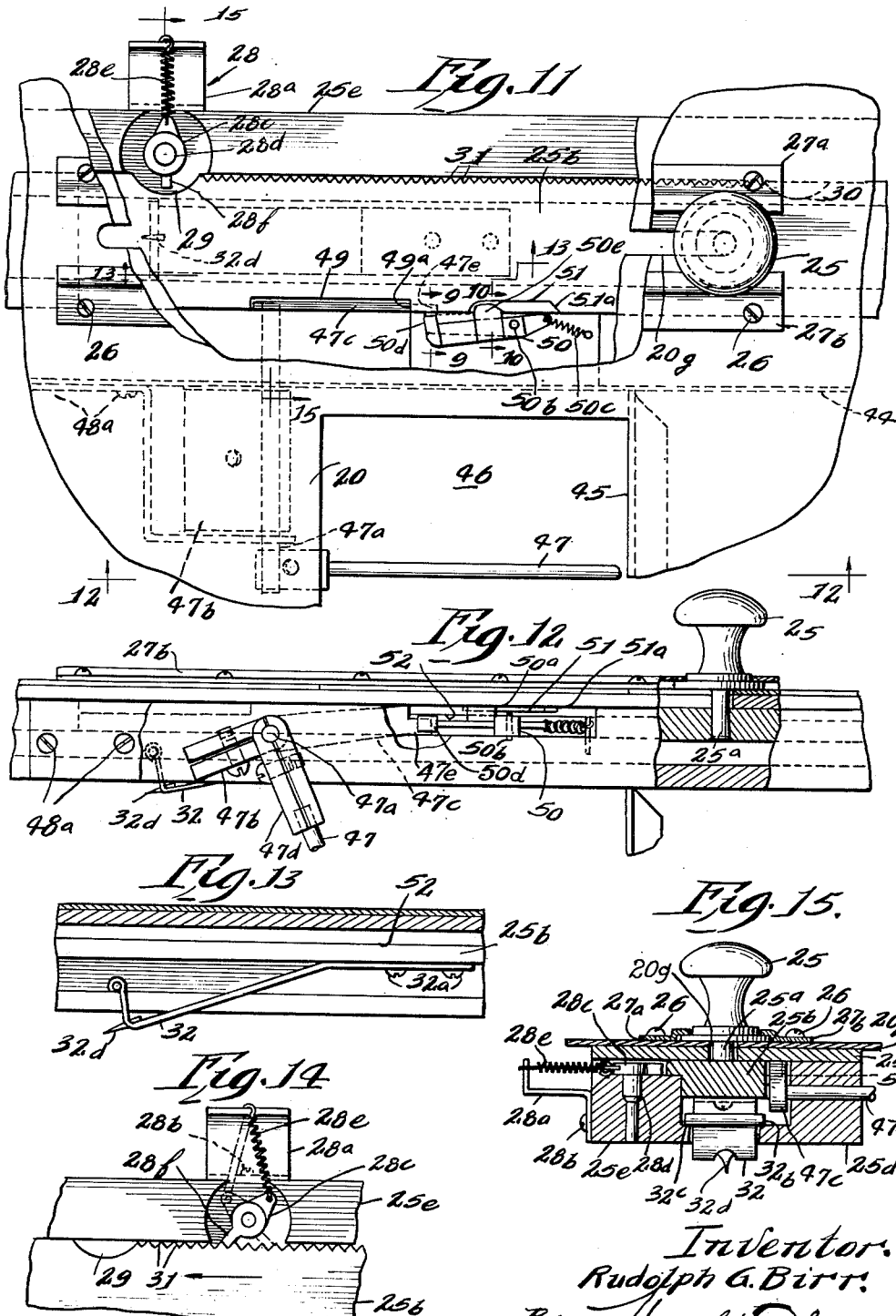
Inventor:
Rudolph G. Birr.
By Harold Olsen
Attorney.

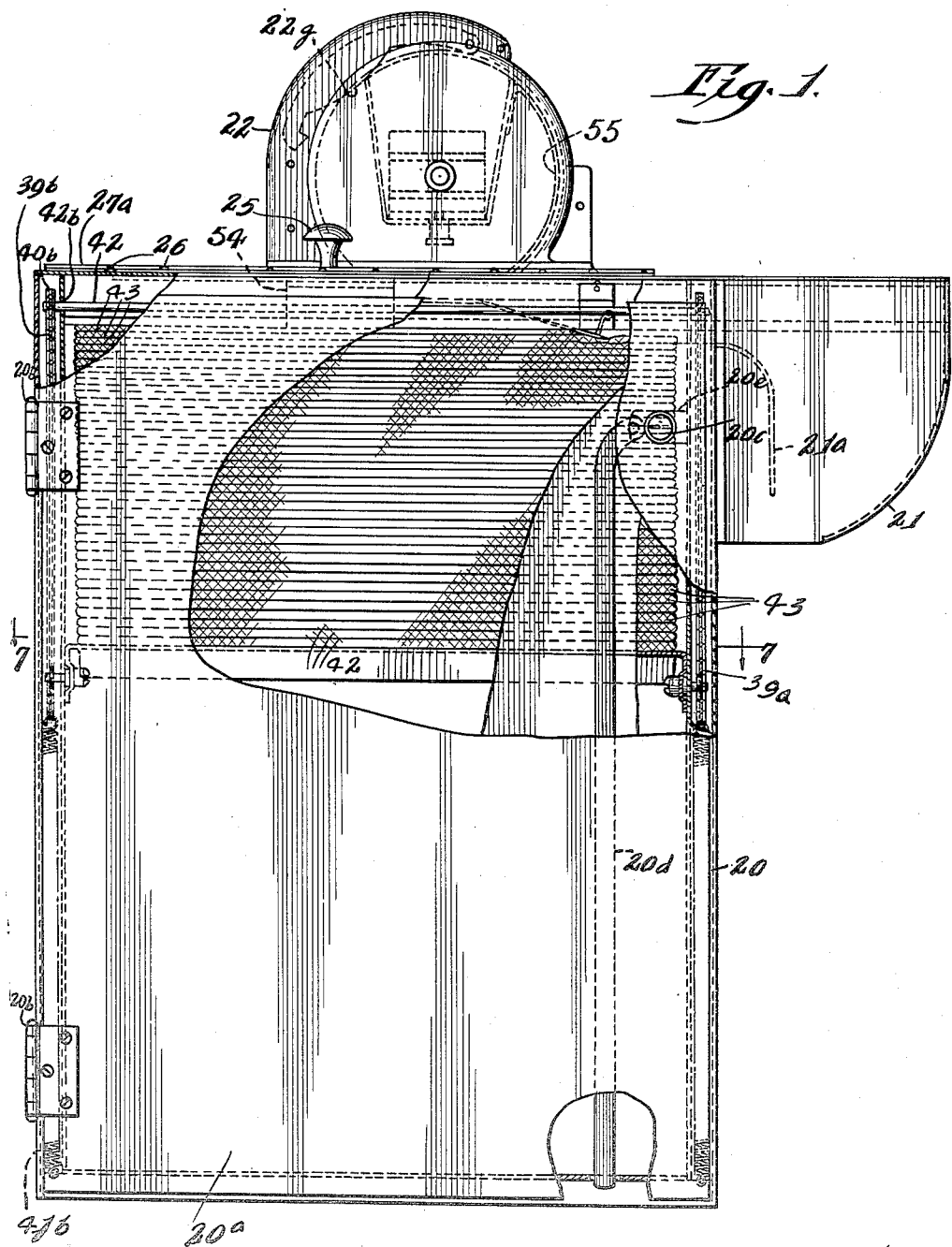

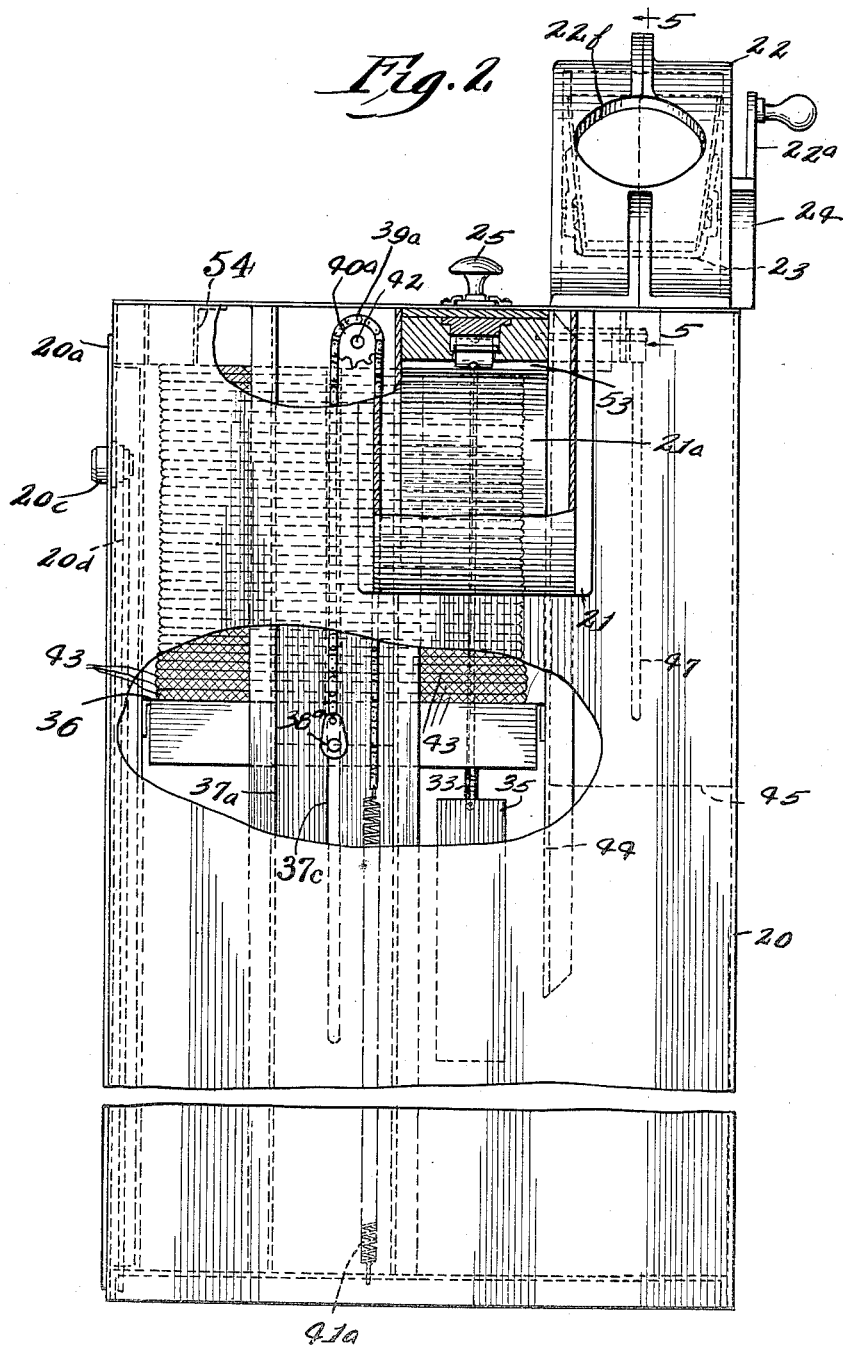

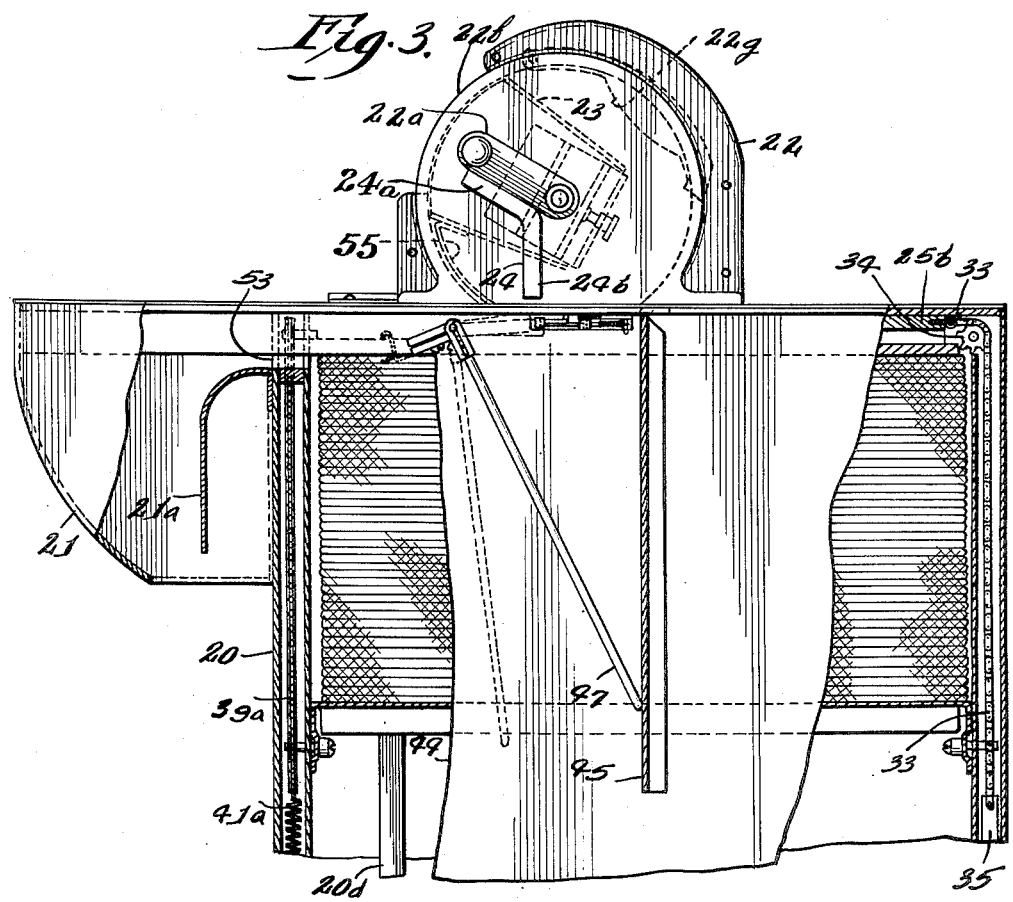

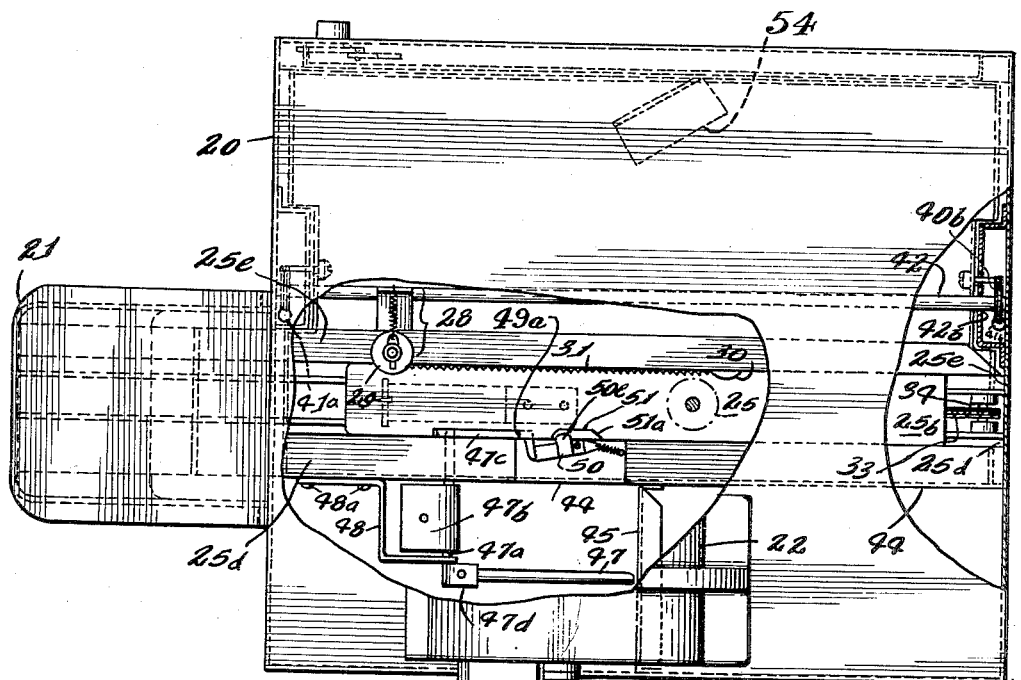
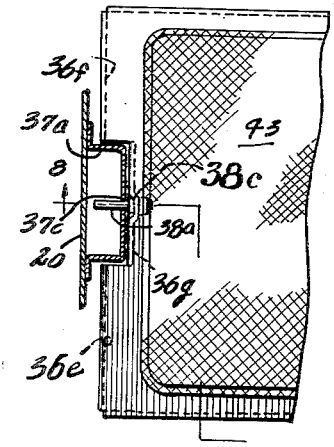
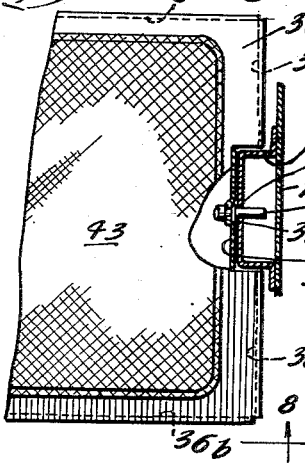
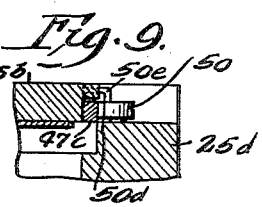
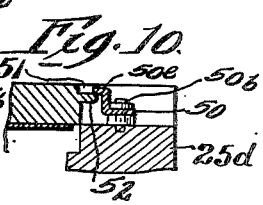
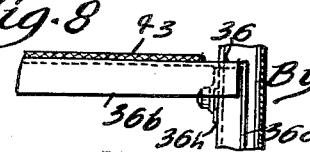

Patented June 29, 1954

2,682,328

UNITED STATES PATENT OFFICE 2,682,328

DISPENSING MACHINE

Rudolph G. Birr, Lombard, Ill., assignor to American Linen Supply Co., Chicago, Ill., a corporation of Nevada Application November 12, 1949, Serial No. 126,770

7 Claims. (Cl. 194—4)

1

The present invention relates in general to dispensing machines and, more particularly, to a novel dispensing machine which is operable to dispense a clean or unused article only in response to the deposit therein of a similar article.

It is the custom in large manufacturing plants and offices to provide clean towels for use by the employees and, in the event that the work is unusually dirty or greasy, clean wiping rags are also provided to remove grease and dirt from the machines, the manufactured items, and from the hands of the employees. Such manufacturing plants and offices are generally serviced by linen supply companies who supply clean towels or rags and who pick up and launder the soiled articles. It has been found, however, that a large quantity of the towels or rags are lost because they are not returned to a central collecting point for pickup by the linen supply serviceman. In attempting to eliminate the loss of the supply company's towels, the employers have, in some instances, assigned an employee to issue a clean towel or rag in return for a soiled article. This method has been found to be somewhat unsatisfactory inasmuch as an employee's time must be utilized in checking and issuing clean articles in return for the soiled articles.

Accordingly, the principal object of the present invention is to provide a machine for dispensing an unused clean article, such as a towel or rag, only in the event that a substantially similar article is deposited into the machine.

One feature of the present invention relates to a checking arrangement adapted to determine whether or not the used article deposited into the machine substantially corresponds to the articles dispensed by the machine.

A further feature of the invention relates to a testing mechanism provided in combination with the checking arrangement which prevents a dissimilar article from being accepted by the machine and also prevents the dispensing machine from being operable to dispense an article stored in the machine.

A further feature of the invention relates to a dispensing mechanism which is normally retained in a locked position and which is automatically unlocked, to permit movement thereof to dispense an article stored in the machine, only in response to the deposit of a substantially similar article; and which may not be reoperated to dispense another unused article until it has been operated through a complete operating cycle and returned to its original locked position.

Further objects and features of the invention pertain to the particular structural arrangement

2 of the dispensing machine whereby the above outlined objects and additional operating features are attained.

The present invention, both as to its organization and method of operation together with further objects and advantages, will best be understood by reference to the following specification taken in connection with the accompanying drawings in which:

Fig. 1 is a left-hand side view of the machine with portions of the exterior cabinet structure broken away in order more clearly to illustrate certain portions of the interior structure;

Fig. 2 is a front view of the machine illustrated in Fig. 1 with portions of the exterior cabinet structure broken away in order more clearly to illustrate certain details of the interior structure;

Fig. 3 is a right-hand side view of the upper portion of the machine illustrated in Figs. 1 and 2 with the side wall of the cabinet structure removed and certain parts of the interior structure broken away in order more clearly to show additional parts of the interior structure;

Fig. 4 is a vertical sectional view taken through the basket receptacle and housing thereof provided on the top surface of the machine and illustrates the basket receptacle in its fully operated dumping position;

Fig. 5 is a sectional view of the basket receptacle and housing taken along line 5—5 of Fig. 2 with the basket receptacle illustrated in a partially operated locked position;

Fig. 6 is a top or plan view of the machine illustrated in Figs. 1, 2 or 3 with parts of the top cabinet structure and basket receptacle housing broken away in order more clearly to illustrate the details of the dispensing slide mechanism and the locking mechanism therefor;

Fig. 7 is a sectional view taken along line 7—7 of Fig. 1 and illustrates the supporting platform or tray for carrying a stack of clean rags to be dispensed by the machine;

Fig. 8 is a sectional view of the supporting platform or tray taken along line 8—8 of Fig. 7;

Fig. 9 is a sectional view taken along line 9—9 of Fig. 11 and illustrates a portion of the locking mechanism for the dispensing slide mechanism of the machine;

Fig. 10 is a sectional view taken along line 10—10 of Fig. 11 and also illustrates a portion of the locking mechanism for the dispensing slide mechanism;

Fig. 11 is an enlarged view of the dispensing slide mechanism and the locking mechanism illustrated in Fig. 6;

Fig. 12 is a sectional view taken along line

12—12 of Fig. 11 and illustrates the relative location of the dispensing slide mechanism and the locking mechanism therefor;

Fig. 13 is a sectional view taken along line 13—13 of Fig. 11 and illustrates the means secured to the dispensing lever for dispensing a single rag from the stack of clean rags stored in the machine;

Fig. 14 is a fragmentary plan view of the double-acting pawl mechanism for determining the direction of movement of the dispensing slide mechanism in the machine; and Fig. 15 is a sectional view taken along line 15—15 of Fig. 11 and illustrates the relationship between the dispensing slide mechanism, the pawl mechanism and the locking mechanism.

The dispensing machine comprises a cabinet 20 having a door 20a in the left side thereof as seen in Fig. 2, which is hinged at 20b to permit the door to be opened to supply the dispensing machine with clean rags. The door 20a is also provided with a lock 20c which controls the locking levers 20d and 20e to engage and disengage cooperating openings in the cabinet structure. The locking arrangement is merely provided to prevent unauthorized persons from gaining access to the interior of the dispensing machine. The cabinet 20 also includes front, back, top, bottom and side panels which are preferably metal and formed in any desirable manner such as, for example, the arrangement employed in manufacturing metal cabinets or lockers.

Referring now to Figs. 1 and 3, the cabinet 20 is also provided with an extended shield 21 having an opening in the lower portion thereof through which a dispensed rag may be withdrawn. The extended shield 20 is secured to the top front portion of the cabinet 20 and constitutes a cover and shield for a portion of the stationary track members for the dispensing slide mechanism member as described hereinafter. Within the extended shield 21 a guide member 21a is provided which is also secured to the front wall of the cabinet 20 in line with the lower edge of the opening 53 and is arranged to guide a dispensed rag toward the opening in the lower portion of the extended shield 21 where it may be readily grasped by a person operating the machine.

Referring now to Figs. 1, 2 and 3, there is provided, on the top surface of the cabinet 20, a housing 22 having an opening 22f into which a soiled or used rag may be deposited in order to unlock the dispensing mechanism of the machine, in the manner to be described hereinafter. The housing 22 is provided with oppositely disposed walls rotatably supporting a rag receptacle 23. The rag receptacle 23 may be rotated by means of a crank 22a from a normal resting position in engagement with the front stop 24a to a fully operated position in engagement with the back stop 24b. The housing 22 also includes a latching member 22d which is pivotally supported on a stud 22e provided in the upper portion of the housing. The latching member 22d is located in the path of travel of the rotatable rag receptacle 23 and normally prevents rotating thereof beyond the position illustrated in Fig. 5.

The rotatable rag receptacle 23 comprises side and end walls 23a and 23b as is best shown in Figs. 4 and 5. The wall members, noted above, may be fabricated from light sheet metal and may be secured, in any desirable manner, to the U-shaped bottom 23e. As is best illustrated in Fig. 4, the bottom 23e is provided with a pair of oppositely disposed shafts 22b and 22c which extend through oppositely disposed bearing holes formed in the side walls of the housing 22. The shaft 22b extends beyond the exterior surface of the housing 22 to support the crank 22a. The rag receptacle 23 is also provided with a movable false bottom 23c having secured thereto a weight 23d which extends through a cooperating opening in the bracket 23e. The weight 23d is provided with a shoulder portion 23f to limit the movement of the false bottom 23c in the bottom of the rag receptacle 23. The weight 23d normally retains the false bottom 23c in the position illustrated in Figs. 3 and 5 but when the rag receptacle 23 is rotated into the position illustrated in Fig. 4, the false bottom 23c, by means of gravity, falls away from the bracket 23e a short distance determined by the shoulder portion 23f on the weight 23d. The movable false bottom 23c is provided in the rag receptacle 23 to insure that a rag deposited therein is dislodged when the rag receptacle 23 is rotated into the inverted position shown in Fig. 4.

Referring now to Fig. 3, it will be seen that the open end of the rag receptacle 23 is normally positioned so that it is directly under the opening 22f in the housing 22. A bracket 24 is secured to the side wall of the housing 22 in order to limit rotation of the crank 22a, in a clockwise direction and in a counterclockwise direction, between the front stop 24a and the back stop 24b on the bent bracket 24. When the crank 22a engages the front stop 24a, the open end of the rag receptacle 23 cooperates with the opening 22f in the housing 22 and when the crank 22a engages the back stop 24b, a rag deposited into the rag receptacle 23 will be dumped into the interior of the cabinet 20.

Referring now to Figs. 2 and 6 it will be seen that on the upper surface of the cabinet 20 there is provided a handle 25 which is located adjacent the receptacle housing 22 and which is movable in a path parallel to the side walls of the cabinet 20. By referring to Fig. 15, it will be seen that the handle 25 is provided with a shaft 25a which extends through the dispensing slide member 25b and is securely fastened thereto. The top panel 20f of the cabinet 20 is provided with a slot 20g and constitutes an opening through which the shaft 25a may be secured in the manner previously noted to the dispensing slide member 25b. The length of the slot 20g determines the extent of movement of the member 25b in the dispensing operation to be described hereinafter.

In order to provide an appropriate track for the dispensing slide member 25b, the track members 25d and 25e are secured to the bottom surface of the top panel 20f on the cabinet 20 by means of the screws 26. The screws 26 extend through the guide strips 27a and 27b, the top panel 20f, and the spacer plate 25c into appropriate holes provided in the track members 25d and 25e. The track members 25d and 25e and the spacer plate 25c extend from the left edge of the extended shield 21 to the right edge or rear of the cabinet 20 as is shown in Fig. 6, thus providing a continuous track for the dispensing slide member 25b. With the dispensing slide member 25b slidably mounted on the track members 25d and 25e in the manner described above, it may be moved from a first position, shown in Figs. 6, 11 and 12 to a second position, which is at the left end of the structure, and returned to its first position. The extent of movement of the dispensing slide member 25b, of course, may be varied as desired and in the present machine, the extent of movement of the slide member 25b is determined by the position of the two-way pawl mechanism 28.

Referring now to Fig. 6, it will be noted that the upper portion of the dispensing slide member 25b is provided with a cutout 29 at its left end and it is also provided with a similar cutout 30 at its right end near the handle 25. Between the two cutouts 29 and 30, the dispensing slide member 25b is provided with a continuous series of teeth 31. The teeth 31, as will be subsequently described, cooperate with the pawl mechanism 28 during the movement of the dispensing slide member 25b between the first position and the second position.

The pawl mechanism 28 (Figs. 11, 14 and 15) comprises a mounting bracket 28a, which is secured to the track member 25e by means of screws 28b; a toggle member 28c pivotally mounted in the track member 25e at 28d; and a spring 28e biased normally to retain the toggle member 28c in the position illustrated in Fig. 11. The pawl 28f on the toggle member 28c extends into the cutout 29 when the dispensing slide member 25b is in its normal first position illustrated in Fig. 11. As soon as the dispensing slide member 25b is moved to the left, the toggle member 28c is rotated in a clockwise direction and the pawl 28f snaps over the first tooth 31 and it engages the successive teeth 31 as the movement of the dispensing slide member 25b is continued. Consequently, the pawl mechanism 28 prevents any return movement of the dispensing slide member 25b until after the cutout 30 therein is positioned opposite the pawl mechanism 28. When this position is reached, the pawl mechanism 28 assumes the position illustrated in the drawings and thereby permits the dispensing slide member 25b to be returned to its original starting position. During the return movement of the dispensing slide member 25b the pawl 28f and the teeth 31 will cooperate to prevent opposite movement of the dispensing slide member 25b. Reference may be had to Fig. 14 for a clearer understanding of the cooperation between the pawl 28f and the teeth 31 on the dispensing slide member 25b.

The dispensing slide member 25b is also provided with a dispensing lever 32 which is secured to the under surface thereof by means of screws 32a. The left-hand end of the dispensing lever 32 is formed with a pair of shoulder members 32b and 32c which normally ride on a pair of cooperating shoulders formed in the track members 25d and 25e, as is best illustrated in Fig. 15. A sharp needle 32d, such as a phonograph needle, is securely fastened to the lever 32 in order to engage a rag to be dispensed from the machine when the dispensing slide member 25b is moved from its first to its second position. The lever 32 is normally tensioned in a counterclockwise direction, as seen in Fig. 13, in order to retain the shoulder members 32b and 32c thereof in engagement with the cooperating shoulders in the track members 25d and 25e.

In order automatically to return the dispensing slide member 25b from its operated left-hand or second position, that is with the cutout 30 thereof positioned adjacent the pawl mechanism 28, a ladder chain 33 is secured to the right-hand end of the dispensing slide member 25b, in any desirable manner, and passed over a sprocket 34, which is supported for rotary movement on a shaft secured between the guide members 25d and 25e in any suitable manner, as is best illustrated in Figs. 3 and 6. The opposite end of the ladder chain 33 terminates in a weight 35. Consequently, when the operator of the machine works the handle 25 on the dispensing slide member 25b to the second position, with the cutout 30 positioned adjacent the pawl mechanism 28, and then releases the handle 25, the weight 35 will then automatically cause the dispensing slide member 25b to be restored to the normal position illustrated in the drawings.

The machine is also provided with an automatic rag feeding and storage mechanism arranged to store a stack of clean rags and to position each succeeding rag in the stack adjacent the dispensing slide member 25b as each rag is dispensed from the top of the stack. The feeding and storage mechanism comprises a tray 36, illustrated in Figs. 7 and 8, which is formed with downwardly extending flanges 36a to 36h, inclusive, in order to add stiffness and strength thereto. The side flanges 36c to 36f, inclusive, are somewhat longer than the remaining flanges of the tray 36, as is best shown in Figs. 2 and 8 and they coact with the sides of the channel members 37a and 37b in order to minimize the tendency of the tray 36 to be tipped. The channel members 37a and 37b are secured to the front and rear panels of the cabinet 20 and extend from the top to the bottom of the apparatus, as is shown in Figs. 2 and 7. A pair of outwardly extending studs 38a and 38b are secured respectively in the opposite flanges 36g and 36h of the tray 36 by means of a pair of lock nuts 38c and 38d. The studs 38a and 38b protrude respectively through slots 37c and 37d formed in the channel members 37a and 37b. The slots 37c and 37d are located in the channels 37a and 37b to cooperate with the studs 38a and 38b and thus provide vertical guides for the tray 36 so that it may be raised and lowered the full length of the slots. The slots 37c and 37d, however, should extend upwardly in the channels 37a and 37b a sufficient distance to permit the last clean rag 43, carried by the tray 36, to be dispensed by the apparatus and they should also extend downwardly a sufficient distance to permit the storage of a number of clean rags 43 in a stack on the tray 36.

In order to permit the tray 36 to be raised and lowered in the slots 37c and 37d, a ladder chain 39a is secured at one end to the stud 38a within the channel 37a. The other end of the ladder chain 39a is passed over the sprocket 40a, located near the top of the cabinet (Fig. 2), and secured to the free end of a spring 41a which is attached at its opposite end to the bottom of the cabinet 20. The opposite stud 38b on the tray 36 is also provided with a ladder chain 39b, a sprocket 40b and a spring 41a, arranged as described above. However, in order to retain the tray 36 in perfect horizontal alignment as it is raised and lowered in the slots 37c and 37d, the sprockets 40a and 40b are rigidly fastened to a shaft 42. The shaft 42, in turn, is rotatably mounted at opposite ends in cooperating bearing holes 42a and 42b respectively provided near the upper ends of the channel members 37a and 37b. With this arrangement, the tray 36, when loaded with a stack of clean rags 43, will be tensioned sufficiently by the springs 41a and 41b to retain the top rag 43 in the stack against the under side of the dispensing slide member 25b, and as each rag 43 is dispensed from the top of the stack, the springs 41a and 41b will automatically move the tray 36 upwardly to position the next succeeding rag 43 in the stack adjacent the dispensing slide member 25b.

In order to provide adequate storage space for deposited soiled rags, the cabinet 20 is divided into two sections by a dividing panel 44. The panel 44 extends between the front and the rear walls of the cabinet 20 and from the top thereof downwardly a distance substantially equal to the bottom edges of the slots 37c and 37d. Since the bottom of the slots 37c and 37d determine the lowermost position of travel of the tray 36, the remaining space below the tray 36 may be utilized as storage space for the soiled rags deposited into the cabinet 20. As a precautionary measure, the dividing panel 44 should extend slightly below the lowest possible position of the tray 36, in order to prevent the deposited soiled rags from interfering with the movement of the tray 36 as each clean rag 43 is dispensed from the stack.

Referring now to Figs. 3, 6 and 11 it will be seen that the space between the dividing panel 44 and the outside wall of the cabinet 20 is further divided by a panel 45. The panel 45 is in alignment with the right-hand edge (Fig. 11) of an opening 46 provided in the top of the cabinet 20 directly under the receptacle housing 22. The panel 45 is provided at this position in order to direct deposited soiled rags against the arm 47, whereby the arm 47 is actuated in the manner to be described hereinafter. The panel 45 extends from the edge of the opening 46 in the top panel of the cabinet 20 downwardly to a point slightly below the bottom end of the arm 47, as is clearly illustrated in Fig. 2. Accordingly, the space between the lower edge of the panel 45 and the bottom of the cabinet and extending from the front to the rear thereof between the dividing panel 44 and the right side of the cabinet 20 (Fig. 2) provides additional storage space for deposited soiled rags.

In order to prevent the apparatus from being operated to dispense a clean rag 43 until a soiled rag is deposited into the apparatus, a locking mechanism is provided which normally locks the dispensing slide member 25b in the position illustrated in the drawings. The locking mechanism includes the arm 47, a shaft 47a, a weight member 47b, and a locking bar 47c, as is best shown in Figs. 6, 11 and 12. The shaft 47a is inserted through an appropriate hole in the track member 25d which forms a bearing for rotatably supporting the shaft 47a. The locking bar 47c is rigidly secured to the shaft 47a in an opening formed in the track member 25d and a slot 49 formed in the dispensing slide member 25b (Figs. 11 and 15). The arm 47 is adjustably secured to the opposite end of the shaft 47a by means of a vise clamp 47d. The weight member 47b is also formed in the shape of a vise clamp and is adjustably secured to the shaft 47a. Since the end of the shaft 47a which carries the weight member 47b and the arm 47 extends beyond the edge of the track member 25d, an additional bearing and support member is provided for the shaft 47a which comprises a support bracket 48 secured at one end by means of screws 48a to the track member 25d. The support bracket 48 is provided with a bearing hole near the free end thereof for rotatably supporting the shaft 47a. With this arrangement, the arm 47 extends diagonally downward across the middle of the opening 46 and, as will be explained hereinafter, may be rotated in a clockwise direction in response to the deposit of a soiled rag through the opening 46. The weight member 47b normally retains the arm 47 and the locking bar 47c in the positions illustrated in Figs. 3 and 12 and it should be understood that the weight of the weight member 47b should be carefully calculated so that it normally balances the arm 47 and the locking bar 47c in the position illustrated in Figs. 3 and 12 and so that the deposit of a rag will cause the arm 47 to move into the dotted position shown in Fig. 3.

Referring now to Figs. 11 and 12, it will be seen that the free end of the locking bar 47c extends diagonally upwardly so that the upper free end thereof extends into the slot 49 and engages the stop 49a in the dispensing slide member 25b. With the locking bar 47c in this position, the dispensing slide member 25b is locked in the first position, illustrated in the drawings, and cannot be moved to its second position until the arm 47 is moved to the left in response to the deposit of a soiled rag into the cabinet 20.

The slot 49 (Fig. 11) provided in the side of the dispensing slide member 25b permits the free end of the locking bar 47c to engage the stop 49a on the dispensing slide member 25b. The free end of the locking bar 47c is formed with an L-shaped cutout so that the vertical leg of the L-shaped cutout forms the cooperating surface which is engaged by the stop member 49a when the locking bar 47c is in the position shown in Fig. 12 and so that the upper surface of the horizontal leg 47e of the L-shaped cutout forms a cooperating surface for a locking bar withholding lever 50.

The locking bar withholding lever 50 is pivotally mounted on a stud 50b and it is tensioned by a spring 50c in a clockwise direction. With this arrangement, a finger 50d on the lever 50 is normally in engagement with the side of the horizontal leg 47e of the L-shaped cutout at the free end of the locking bar 47c as is illustrated in Figs. 6, 9 and 11. Consequently, when the locking bar 47c is rotated slightly in a clockwise direction (Fig. 12), due to the deposit of a soiled rag into the cabinet 20, the L-shaped cutout at the free end of the locking bar 47c will disengage the stop 49a in the slide member 25b and as soon as the horizontal leg 47e has moved downwardly sufficiently to clear the lower edge of the finger 50d, the finger 50d will rotate in a clockwise direction (Fig. 11) and snap in place over the top surface on the horizontal leg 47e of the L-shaped cutout at the free end of the locking bar 47c. When this occurs, the locking bar 47c will be held in an unlocked position out of engagement with the stop 49a by the finger 50d. This action will unlock the dispensing slide member 25b and thereby enable an operator to actuate the same to the left (Figs. 6, 11 and 12) in order to dispense a clean rag 43 in the manner to be described hereinafter.

In order to provide an automatic control for the withholding lever 50 and its cooperating finger 50d so that the locking bar 47c may be conditioned to again lock the dispensing slide member 25b upon its return to the original starting position, a cam follower 50e is provided which moves into a cam slot 51 in the side of the slide member 25b when the withholding lever 50 and the finger 50d thereon is positioned to withhold the locking bar 47c out of its locking position, as described above. The movement of the dispensing slide member 25b to the left (Fig. 11) will cause the cam surface 51a in the cam slot 51 to engage the cam follower 50e and thereby rotate the withholding lever 50 in a counterclockwise direction, as seen in Figs. 6 and 11. This action will cause the finger 50d to disengage the top surface of the horizontal leg 47e of the L-shaped cutout in the locking bar 47c and thus conditions the locking bar 47c so that it may subsequently be restored to its locking position. However, as previously noted, the locking bar 47c cannot be restored to its locking position until the dispensing slide member 25b is again returned to the position illustrated in the drawings. In this connection, it should be noted that the withholding lever 50 is held in the position shown in Figs. 6 and 11 either by the engagement of the cam follower 50e with the side of the dispensing slide member 25b or by the engagement of the finger 50d with the side of the leg 47e of the locking bar 47c. After the finger 50d of the lever 50 has been tripped and disengaged from the leg 47e of the locking bar 47c by the cam 51a and the cam follower 50e, the top edge of the vertical leg of the L-shaped cutout at the free end of the locking bar 47 will move upwardly until it engages and rides on the lower surface 52 (Figs. 12, 13 and 15) on the dispensing slide member 25b.

In order to place the dispensing apparatus in an operative condition, it must first be loaded with a stack of clean rags. Preferably, the rags 43 are folded to provide at least two thicknesses of material at the point where the top rag is engaged by the needle 32d on the dispensing lever 32. The serviceman supplying the clean rags unlocks the door 20a in the cabinet 20 by means of a key retained in his possession. The tray 36 is then moved to the bottom of the cooperating guide slots 37c and 37d and held in this position while a stack of clean rags 43 are positioned thereon. When the tray 36 is fully loaded with clean rags, the serviceman releases the tray 36 which will be raised upwardly under control of the tensioned springs 41a and 41b until the top rag 43 in the stack presses against the lever 32, the needle 32d and the bottom surfaces of the track members 25d and 25e as is clearly illustrated in Figs. 1, 2 and 3. The guide bracket 54 is secured to the bottom surface of the top panel 20f on the cabinet structure and is positioned at an angle with respect to the side of the cabinet in order to retain the stack of clean rags 43 in a relatively stationary position as the top rag 43 is being dispensed by the machine. Also, the guide bracket 54, due to its angular position, directs the top rag 43 through the slotted opening 53 in the side of the cabinet toward the dispensing guide 21a during the dispensing operation. The cabinet 20 is now fully loaded with a stack of clean rags 43 and the serviceman now locks the door 20a to place the dispensing apparatus in condition for operation.

As previously noted, the dispensing apparatus is normally in a locked condition and cannot be operated to dispense a clean rag 43 until a substantially identical rag is first deposited into the machine. In order to unlock the machine for operation a wadded used rag is first inserted through the opening 22f in the receptacle housing 22 and stuffed into the rotatable rag receptacle 23. The used rag must be substantially the same as the clean rags 43 stored within the cabinet, otherwise the latching member 22d will prevent the receptacle 23 from being rotated sufficiently to dump the used rag into the cabinet 20. If the used rag is substantially the same as the clean rags 43, the rag receptacle 23 will be completely filled and the rag contained therein will actuate the cam 22g on the latching member 22d as the rag receptacle 23 is rotated. The rag receptacle 23 may now be rotated in a clockwise direction, as seen in Figs. 3 and 5, by means of the crank 22a. During rotation of the rag receptacle 23, the forward top edge 23g thereof first engages the cam 22g on the latching member 22d and as the cam 22g rides over the forward top edge 23g, the latching member 22d is automatically raised from its locking position. Due to the contour of the cam 22g, the latching member 22d tends to drop to the position shown in full in Fig. 5 in order to prevent further rotation of the rag receptacle 23. This action is provided to prevent acceptance of an improper article deposited in the rag receptacle 23. However, if a proper rag is deposited into the rag receptacle 23, the cam 22g will ride over the top of the rag and hold the latching member 22d in the raised or unlocked dotted position shown in Fig. 5. Consequently, the forward top edge 23g of the rag receptacle 23 may be rotated beyond the latching member 22d to the dumping position shown in Fig. 4.

After the rear top edge 23h of the rag receptacle 23 moves beyond the cam 22g, the latching member 22d may drop sufficiently to engage the same and inadvertently prevent complete rotation of the rag receptacle 23 to the dumping position. If the deposited rag contained in the rag receptacle 23 should fail to prevent such action, the bracket 55 secured to the top trailing rear edge 23h of the rag receptacle 23 will engage the cam 22g and thereby hold the latching member 22d in the unlocked position. This bracket 55 is also designed to close the opening 22f in the housing 22. It should be understood, however, that the bracket 55 would not become effective during the rotation of the rag receptacle 23 until the rear top edge 23h thereof has been rotated beyond the cam 22g. During the first portion of the return movement of the rag receptacle 23, that is the counterclockwise rotation, the bracket 55 will also prevent the latching member 22d from engaging the rear top edge 23h. The latching member 22d will also ride over the forward top edge 23g of the rag receptacle 23. The extent of the rocking motion of the latching member 22d on the stud 22e may be limited in any desired manner, for example, by means of a slotted hole in the latching member 22d and a cooperating pin inserted therethrough and secured in the housing 22.

When the rag receptacle 23 has been rotated to the dumping position shown in Fig. 4, the crank 22a will engage the back stop 24b and the rag which has been stuffed into the rag receptacle 23 will be dropped into the cabinet 20 through the opening 46 upon the arm 47. In order to insure that the rag is dislodged from the rag receptacle 23, the false bottom 23c will fall away, due to gravity, from the U-shaped bottom bracket 23e, as seen in Fig. 4, and thereby eject the rag from the inverted rag receptacle 23.

When the deposited rag falls through the opening 46 upon the arm 47, it will rotate in a clockwise direction to the dotted position shown in Fig. 3. Although the arm 47 has been illustrated as a straight rod, it may be of some advantage to form it in the shape of a fork having several tines to insure that it will be actuated by the falling rag in the manner described. When the arm 47 is rotated to the dotted position shown in Fig. 3, the locking bar 47c will also rotate a like amount in a clockwise direction to withdraw the L-shaped end thereof from the stop 49a in the dispensing slide member 25b. When this occurs, the finger 50d in the withholding lever 50 will snap in place, as previously described, above the horizontal leg 47e to hold the locking bar 47c in an unlocked position until the dispensing slide member 25b has been actuated.

The dispensing apparatus is now conditioned to be operated to dispense a clean rag 43 from the top of the stack stored on the tray 36.

The operator may now grasp the handle 25 of the dispensing slide member 25b and slide the same toward the front of the cabinet 20, as seen in Fig. 2, or to the left as shown in Fig. 11. As soon as the dispensing slide member 25b is moved, the needle 32d on the dispensing lever 32 pierces the top rag 43 and begins to slide the same toward the opening 53 located, above the dispensing guide 21a (Fig. 3). Also, as soon as the dispensing slide member 25b has been moved a relatively short distance, the teeth 31 engage the pawl 28f on the two-way ratchet mechanism 28. As soon as the pawl 28f engages first tooth, the dispensing slide member 25b is prevented from being returned to the original starting position. The dispensing slide member 25b, as it is moved to the left under control of the operator, actuates the withholding lever 50, by cooperation between the cam surface 51a and the cam follower 50e, to trip the finger 50d thereof from the horizontal leg 47e of the locking bar 47c. The cam follower 50e will now hold the finger 50d out of the path of the leg 47e on the locking bar 47c until the slide member 25b is again returned to its first position. Due to the weight member 47b secured to the shaft 47a, the rod 47 and the locking bar 47c are partially returned to their original positions. However, the complete return of the locking bar 47c and the arm 47 to the original locking position is prevented during the movement of the dispensing slide member 25b until the slot 49 and the stop 49a are returned to the position shown in the drawings due to the fact that the upper edge of the vertical leg of the L-shaped cutout of the locking bar 47c rides on the lower sliding surface 52 of the slide member 25b. During the cycle of operation of the dispensing slide member 25b, the upper edge of the vertical leg of the L-shaped cutout on the locking bar 47c engages the sliding surface 52 on the under side of the dispensing slide member 25b. As the dispensing slide member 25b continues to be moved to the left (Fig. 6), the top rag 43 on the stack is drawn from under the bracket 54 and it is threaded through the opening 53 in the cabinet 20. The bracket 54 prevents the second rag 43 in the stack from also being inadvertently dislodged from its normal position. When the dispensing slide member 25b reaches the full extent of its left-hand movement (Figs. 3 and 6), the two-way ratchet mechanism 28 is adjacent the right hand cutout 30 and it restores to the normal position, illustrated in Figs. 6 and 11. The ratchet mechanism 28 is now in condition to become effective in the opposite direction as the dispensing slide member 25b returns to its normal starting position.

If the operator now releases the handle 25, the weight 35 secured to the rear end of the dispensing slide member 25b becomes effective and causes the slide member 25b to start its return movement. As soon as the dispensing slide member 25b begins to restore, the needle 32d is withdrawn from the rag 43, which it has carried through the opening 53 in the cabinet 20 and the rag 43 drops down over the curved surface of the guide member 21a. The end of the rag 43 extends through an opening provided at the bottom of the extended shield 21 so that it may be grasped by the operator and withdrawn therefrom. During the return movement of the dispensing slide member 25b, the needle 32d on the dispensing lever 32 rides over the clean rag 43 which is now at the top of the stack. The teeth 31 on the dispensing slide member 25b in cooperation with the two-way ratchet mechanism 28 prevent movement of the slide member 25b in the opposite direction, should the operator attempt to falsely obtain an additional clean rag 43 before the slide member 25b has been restored to normal. Just before the slide member 25b returns to its original first position, the cam follower 50e rotates in a clockwise direction (Fig. 11), under the tension of the spring 50c, as it rides from the side of the member 25b and over the cam surface 51a into the cam slot 51. Since the upper edge of the horizontal leg of the L-shaped cutout on the free end of the locking bar 47c is in engagement with the sliding surface 52 of the member 25b, the horizontal leg 47e of the L-shaped cutout on the locking bar 47c is positioned so that the finger 50e merely engages the side of the leg 47e. When the dispensing slide member 25b is finally returned to the original starting position, the L-shaped cutout on the locking bar 47c and the arm 47 are returned to the locking position by means of the weight member 47b and the ratchet mechanism 28 is restored to its normal position. The stop 49a in the dispensing slide member 25b is now positioned so that it will be engaged by the vertical leg of the L-shaped cutout in the locking bar 47c and it cannot be actuated to dispense another clean rag 43 until a substantially similar rag is deposited in the cabinet 20.

As each clean rag 43 at the top of the stack on the tray 36 is dispensed in the manner described above, the springs 41a and 41b and the ladder chains 39a and 39b cause the tray 36 to move upwardly and thus position the next clean rag 43 in the stack adjacent the dispensing slide member 25b.

The soiled or used rags deposited within the cabinet 20 during the dispensing operations of the machine are accumulated at the bottom of the cabinet 20 below the tray 36, since the slots 37c and 37d in which the tray 36 travels do not extend to the bottom of the cabinet. The accumulated rags may be collected for laundering each time the supply of clean rags on tray 36 is replenished by the serviceman.

In view of the foregoing, it is apparent that a dispensing cabinet is provided which comprises a checking arrangement for preventing the dispensing of a clean rag stored within the cabinet unless a substantially similar rag is deposited and accepted by the apparatus and wherein the dispensing mechanism may be operated to issue only a single clean rag in response to each dispensing operation. While the apparatus has been disclosed as a rag dispenser, it should be understood that it may also be utilized to dispense clean towels, napkins, etc.

While one embodiment of the invention has been disclosed, it will be understood that various modifications may be made therein which are within the true spirit and scope of the invention.

What is claimed is:

1. In a dispensing apparatus, a dispensing slide operable at certain times to dispense rags stored in said apparatus, locking means normally preventing operation of said slide, a receptacle for receiving a used rag of substantially the same bulk as any one of the rags stored in said apparatus, means for moving said receptacle, a stop member in the path of movement of said receptacle and effective to prevent movement of said receptacle beyond said stop member in the event said receptacle fails to contain a rag that is of substantially the same bulk as one of the rags stored in said apparatus and for permitting movement of said receptacle beyond said stop member in the event said receptacle is substantially filled by a used rag, means actuated in the event said receptacle is moved beyond said stop member for removing said used rag from said receptacle, and means controlled in response to the removal of said used rag from said receptacle for controlling said locking means to unlock said dispensing slide for operation to dispense a rag stored in said apparatus.

2. In a dispensing apparatus, a dispensing slide operable at certain times to dispense rags stored in said apparatus, locking means normally preventing operation of said slide, a receptacle for receiving a wadded used rag of substantially the same bulk as one of said stored rags, means for moving said receptacle, a stop member in the path of movement of said receptacle and effective normally to prevent movement of said receptacle beyond said stop member, means controlled in the event said receptacle contains a wadded rag that is of substantially the same bulk as one of the rags stored in said apparatus for rendering said stop member ineffective, means actuated in the event said receptacle is moved beyond said stop member for removing said wadded rag from said receptacle, and means controlled in response to the removal of said wadded rag from said receptacle for controlling said locking means to unlock said dispensing slide for operation to dispense one of said rags stored in said apparatus.

3. In a dispensing apparatus, a stack of rags stored therein, a dispensing mechanism operative to dispense a rag from the top of said stack, a locking lever normally preventing operation of said dispensing mechanism, a storage space for used rags, a passage leading to said storage space, a receptacle for receiving a used rag, means for moving said receptacle to a discharge position, a stop member normally preventing movement of said receptacle to said discharge position, test means for testing the bulk of the contents of said receptacle and controlled in the event said receptacle is substantially filled by a wadded used rag of substantially the same bulk as a wadded one of said stored rags for rendering said stop member ineffective, means effective responsive to movement of said receptacle to said discharge position for discharging said wadded used rag therefrom into said passage, and means in said passage actuated by the discharge of said wadded rag into said passage for controlling said locking lever to permit operation of said dispensing mechanism to dispense a single rag from the top of said stack.

4. A dispensing apparatus for rags, which comprises a movable support for a stack of rags, a dispensing mechanism operative through a cycle to dispense a rag from the top of said stack, locking means normally preventing operation of said dispensing mechanism, storage space for used rags, a passage leading thereto, a rag receptacle for receiving a deposited wadded used rag of substantially the same bulk as a wadded one of said rags on said stack, means for moving said receptacle to a dumping position, means normally preventing said movement of said receptacle to said dumping position, means for rendering said last-mentioned means ineffective in order to permit said movement of said receptacle to said dumping position to dump said used rag into said passage only in the event said wadded used rag is of substantially the same bulk as a wadded one of said rags on said stack, means actuated by said used rag passing through said passage for rendering said locking means ineffective, and means controlled thereafter in response to a single operation of said dispensing mechanism for returning said locking means to normal.

5. A dispensing apparatus for rags, which comprises a movable support for a stack of rags, a dispensing mechanism operative through a cycle from a first position to a second position and then back to said first position to dispense a rag from the top of said stack, locking means normally preventing operation of said dispensing mechanism, storage space for used rags, a passage leading thereto, a receptacle for receiving a wadded used rag of substantially the same bulk as a wadded one of the rags dispensed by the apparatus, means for moving said receptacle from a first position through a test position into a dumping position, a test mechanism at said test position governed during movement of said receptacle to preventing movement thereof into said dumping position in the event a spurious wadded used rag of insufficient bulk is received in said receptacle and for permitting movement of said receptacle into said dumping position in the event a genuine wadded used rag of sufficient bulk is received in said receptacle, means effective responsive to movement of said receptacle into said dumping position for ejecting said wadded used rag into said passage, means supported in said passage actuated by a wadded used rag passing through said passage for rendering said locking means ineffective, and means controlled thereafter in response to a single cycle of operation of said dispensing mechanism for returning said locking means to normal.

6. In a dispensing cabinet for rags or the like, a top cover for said cabinet, track members secured to the underside of said cover, a rack slidably mounted on said track, manual means secured to said rack and extending above said cabinet cover for moving said rack on said track from a first position to a second position, a platform within said cabinet supporting a stack of rags, means secured to said platform continuously pressing the top rag on the stack against the underside of said track, a resilient member secured at one end thereof to the underside of said rack and having a free end extending downwardly between said track members, a piercing member secured to said free end of said resilient member adapted to pierce the uppermost rag on said stack, a locking bar supported on one of said track members having a locking position in the path of travel of said rack to normally prevent movement thereof from said first position toward said second position, a passage through which a soiled rag may be deposited into said cabinet, means actuated by a soiled rag passing through said passage for moving said locking bar out of said locking position, a spring-tensioned finger pivotally secured to said one track member normally engaging one side of said locking bar, said finger in response to said movement of said locking bar out of said locking position rotating on said pivot to prevent said locking bar from returning to said locking position thereby to permit movement of said rack from said first position to said second position, said piercing member during said movement of said rack piercing the top rag on said stack and sliding the same from said stack, a weight secured to said rack for returning the same from said second position to said first position, and cam means on said rack controlling said finger to move the same away from said locking bar to permit said locking bar to again return to its locking position incident to said return of said rack to said first position.

7. In a dispensing cabinet for rags or the like, a top cover for said cabinet, track members secured to the underside of said cover, a rack slidably mounted on said track, manual means secured to said rack and extending above said cabinet cover for moving said rack on said track from a first position to a second position, a platform within said cabinet supporting a stack of rags, means secured to said platform continuously pressing the top rag on the stack against the underside of said track, a resilient member secured at one end thereof to the underside of said rack and having a free end extending downwardly between said track members, a piercing member secured to said free end of said resilient member adapted to pierce the uppermost rag on said stack, a locking bar supported on one of said track members having a locking position in the path of travel of said rack to normally prevent movement thereof from said first position toward said second position, a passage through which a soiled rag may be deposited into said cabinet, a member secured to said locking bar for rotating it out of said locking position in order to unlock said rack in response to the passing of a soiled rag through said passage, a finger pivoted on said one track member normally engaging one side of said locking bar and tensioned to rotate on said pivot to hold said locking bar out of said locking position whenever said locking bar is rotated out of said locking position, movement of said rack from said first position to said second position causing said piercing member to slide the top rag on said stack to dispense the same, a cam surface on said rack effective during movement thereof between said first position and said second position to rotate said finger about its pivot to condition said locking bar to be returned to said locking position, and a surface on the underside of said rack holding said locking bar out of said locking position until said rack is again returned to said first position.

References Cited in the file of this patent

UNITED STATES PATENTS

| Number | Name | Date |
|---|---|---|
| 494,444 | Salter et al. | Mar. 28, 1893 |
| 683,202 | Grener | Sept. 24, 1901 |
| 744,673 | Balsley | Nov. 17, 1903 |
| 1,193,967 | Antoine et al. | Aug. 8, 1916 |
| 2,471,055 | Asbill, Jr. | May 24, 1949 |

FOREIGN PATENTS

| Number | Country | Date |
|---|---|---|
| 475,498 | Great Britain | Nov. 16, 1937 |